E. J. BRISBEN.
PIPE HOLDING VISE.
APPLICATION FILED DEC. 2, 1914. RENEWED DEC. 3, 1919.
1,340,147.
Patented May 18, 1920.
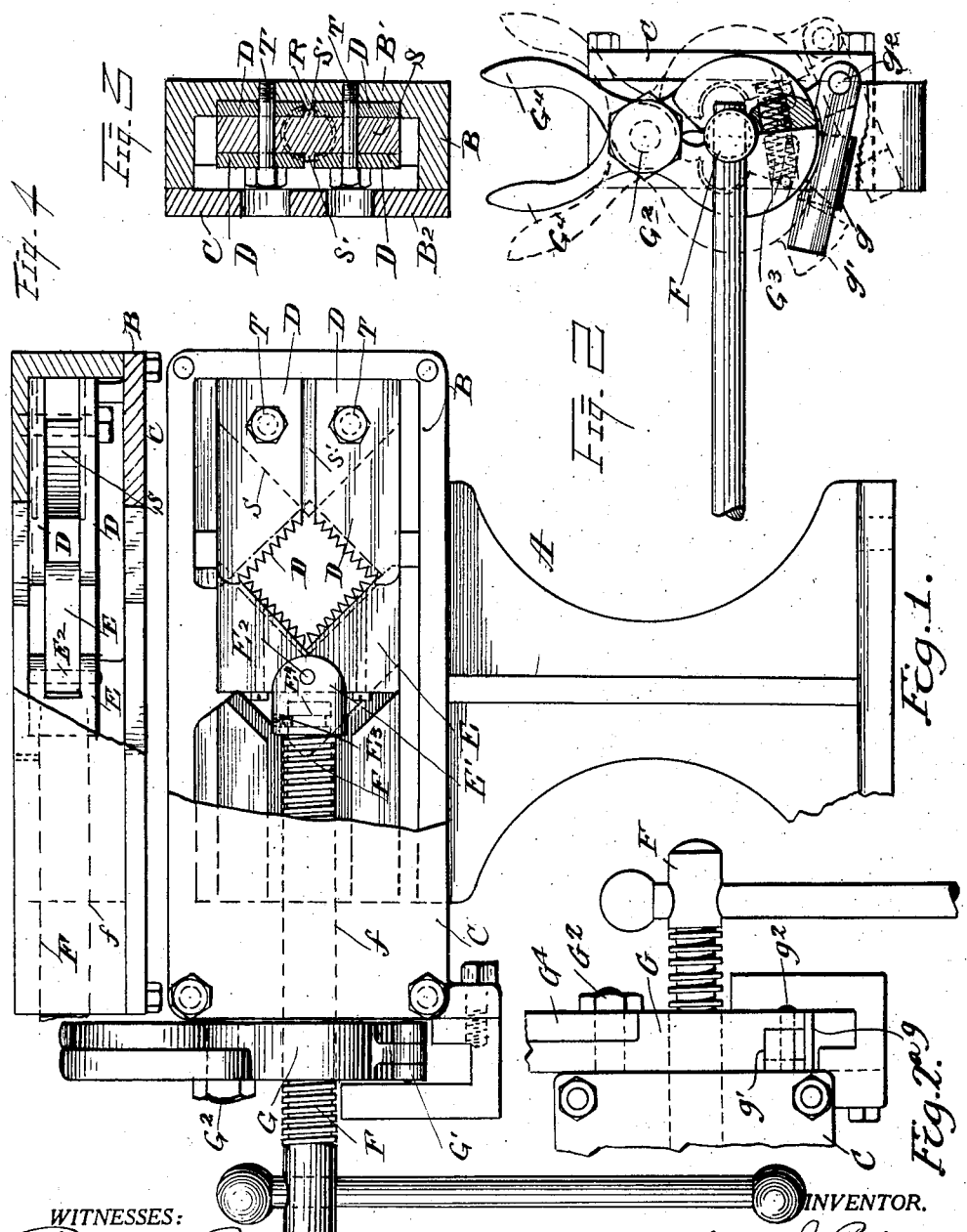

UNITED STATES PATENT OFFICE.

ERNEST J. BRISBEN, OF CLEVELAND, OHIO.

PIPE-HOLDING VISE.

1,340,147.    Specification of Letters Patent.     Patented May 18, 1920.

Application filed December 2, 1914, Serial No. 875,054. Renewed December 3, 1919. Serial No. 342,305.

*To all whom it may concern:*

Be it known that I, ERNEST J. BRISBEN, a citizen of the United States, and resident of Cleveland, in the county of Cuyahoga and State of Ohio, have invented certain new and useful Improvements in Pipe-Holding Vises, of which I hereby declare the following to be a full, clear, and exact description, such as will enable others skilled in the art to which it appertains to make and use the same.

The objects of the invention are to provide an easily adjusted form of vise for holding metal tubing while screw threads are being formed thereon.

The invention includes a standard fixed and movable jaws therein, and a screw feed shaft for the movable jaw; it also includes a divided nut through which the feed screw passes, means for welding the parts together and for automatically separating them when released.

It also includes features of construction of the dies and means for guiding the movable die and for securing the fixed dies in position, as hereinafter described, shown in the accompanying drawings and specifically pointed out in the claims.

In the accompanying drawings Figure 1 is a side elevation of the device; Fig. 2 is an end view thereof showing the divided nut; Fig. 2$^a$ is a side elevation of the locking means shown in Fig. 2, from the opposite side of the view shown in Fig. 1; Fig. 3 is a transverse section through the fixed jaws; Fig. 4 is a longitudinal horizontal central section through the fixed jaws.

In these views A is a standard or frame supporting a rectangular hollowing casing B in which are secured the fixed jaws D, D, and the slidingly movable jaw E, which moves in suitable guides between the back B' and cover B$^2$ of the casing.

F is a feed or operating screw for the movable jaw; this finds a journal bearing at $f$ in the frame, but operates in a nut which is formed in two portions G and G', pivoted together and to the frame at G$^2$. These portions are given a normal tendency to separate by means of a coiled spring G$^3$.

Handles G$^4$, G$^4$ projecting from the nut portions serve to engage the nut portions with the feed screw, and a locking dog or keeper $g$, upon one portion, is engaged by means of a link $g'$ upon the other portion and pivoted thereon at $g^2$.

The feed screw is connected with the jaw E by means of an intermediate fork E' in which the jaw is swiveled at E$^2$ and a set screw E$^3$ in the neck of the fork engages a groove E$^4$ in the shaft thus permitting free rotation thereof.

The fixed jaws are paired and the pairs are spaced apart preferably a distance equal to the thickness of the movable jaw, so that the movable jaw can pass between them, so that the adjustment can be made for small tubing.

They are mounted in the extremity of the casing in the following manner.

One pair (right and left respectively) are secured to the rear wall of the casing and alined and separated by means of a slight longitudinal rib R. An intermediate spacing block S having a similar rib S' upon each side thereof is next placed in position over the first pair of jaws, and the second pair of jaws are seated upon the spacing block and separated by the rib on the outer face thereof.

Screws T, T, passing through the jaws and spacing block enter the back of the casing and secure the parts together.

This construction makes the jaws interchangeable in portions and economizes in the use of the expensive material from which the jaws are constructed, since the spacing block can be made of ordinary cast iron. It also enables the operator to discard any one portion of the jaws when the teeth become unevenly worn, so as to repair the same by regrinding.

It also greatly facilitates the first grinding of teeth since the right and left portions can be separately handled. Otherwise, grinding of the teeth would be practically impossible of performance.

In Fig. 4 the relation of the jaws to each other is plainly seen.

The movable jaw is guided between the rear wall and corner of the casing during the first portion of its movement and is guided by the fixed jaws between which it passes during the balance of its movement.

Having described the invention what I claim as new and desire to secure by Letters Patent is;

1. In a pipe holding vise, a casing having an opening, duplicate pairs of fixed jaws spaced apart at one end of said opening, a separate spacing block longitudinally flanged on opposite sides for said pairs of jaws, and detachable retaining means for said jaws and block, and a movable jaw in said casing adapted to enter the space between the extremities of said pairs of fixed jaws.

2. In a pipe holding vise, in combination, a casing having an elongated central opening and a transverse opening in its walls, a spacing block in said casing, duplicate pairs of spaced jaws secured to the spacing block and to said casing, one pair upon each side of said block, a rib upon said spacing block extending between the jaws in each pair, means for detachably securing said pairs of jaws and spacing block together and to the casing, and an opposed jaw movable between said pairs of jaws.

In testimony whereof, I hereunto set my hand this 16th day of November, 1914.

ERNEST J. BRISBEN.

In presence of—
CHAS. H. OLDS,
WM. M. MONROE.